Figure 6:
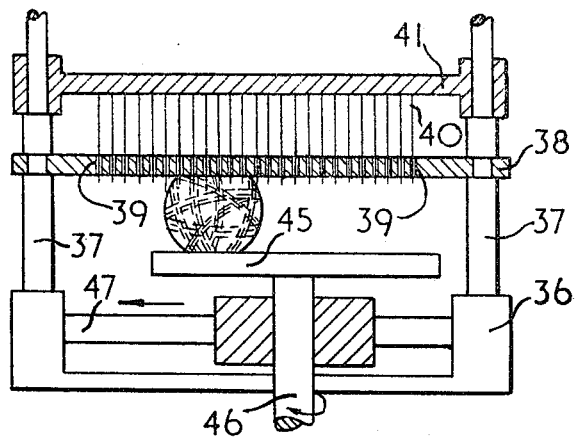

Nov. 29, 1966  R. S. GOY  3,287,786
APPARATUS FOR MAKING SHAPED FELT
Original Filed Dec. 2, 1963  4 Sheets-Sheet 1
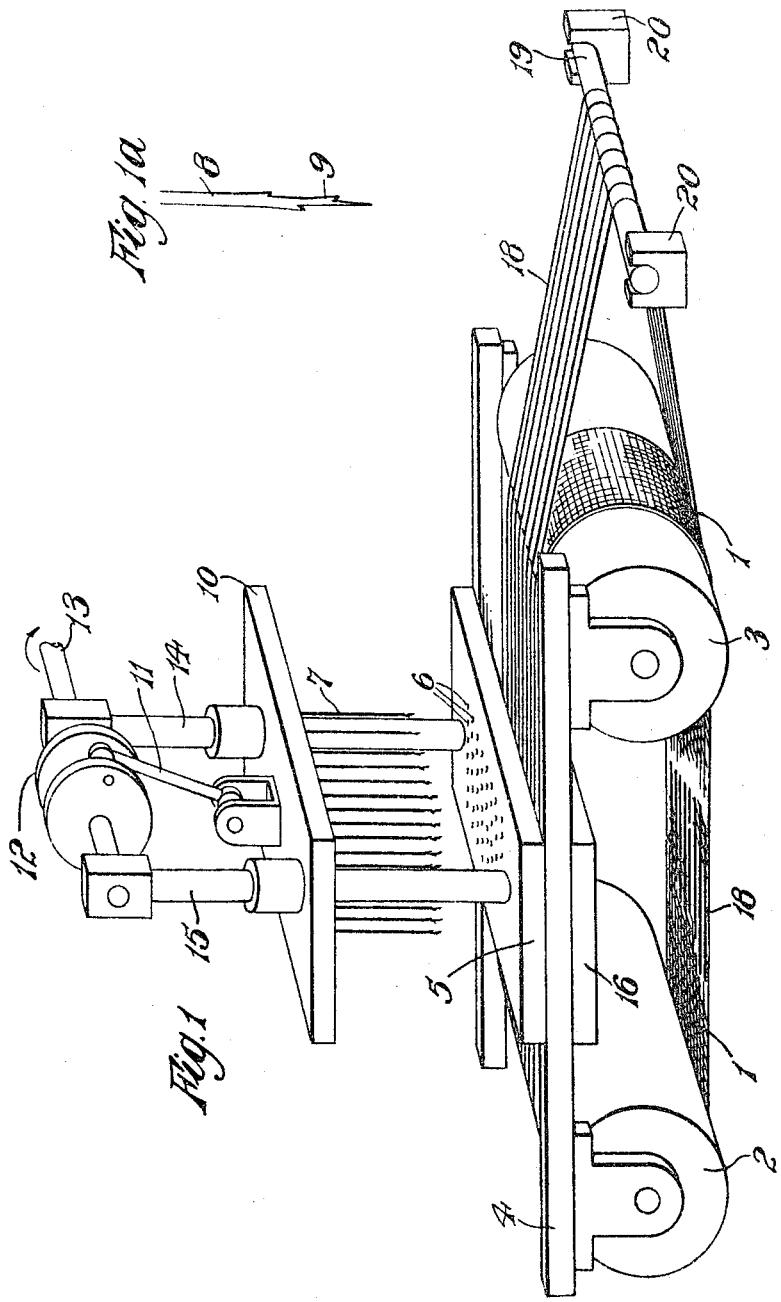
Inventor
Ronald Stansfield Goy
Stevens, Davis, Miller & Mosher
Attorneys

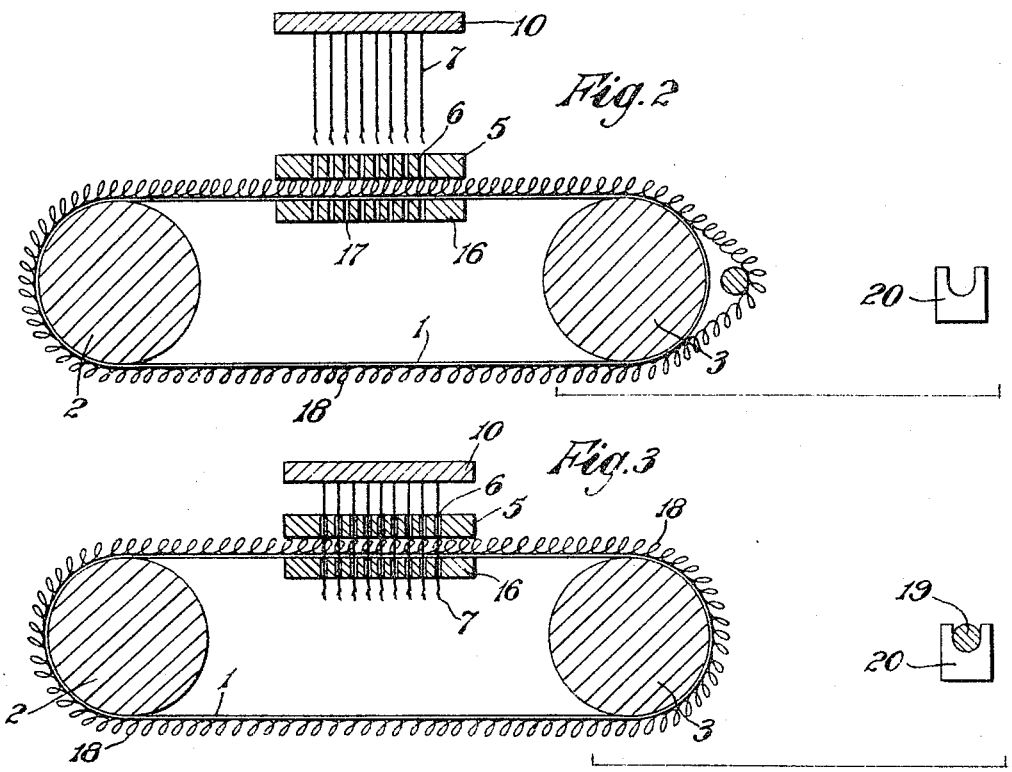

Nov. 29, 1966 R. S. GOY 3,287,786
APPARATUS FOR MAKING SHAPED FELT
Original Filed Dec. 2, 1963 4 Sheets-Sheet 3
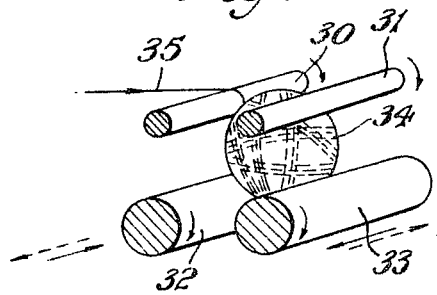
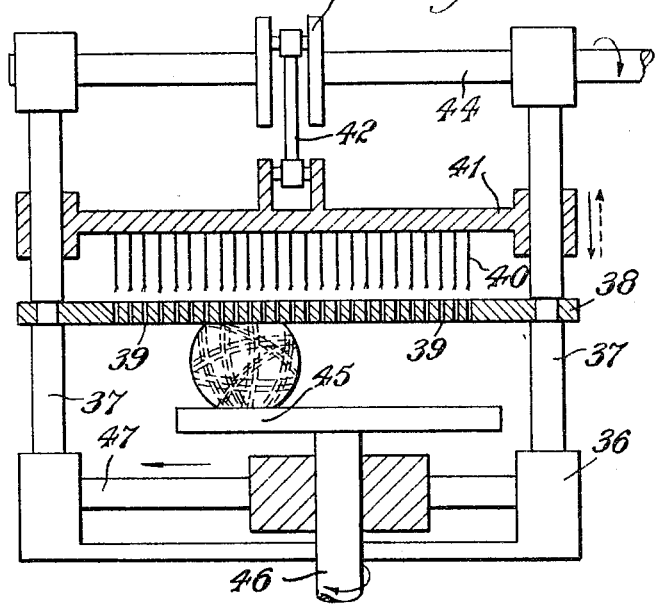
Inventor
Ronald Stansfield Goy
Attorneys Nov. 29, 1966 R. S. GOY 3,287,786
APPARATUS FOR MAKING SHAPED FELT
Original Filed Dec. 2, 1963 4 Sheets-Sheet 4

Ronald Stansfield Goy
By Stevens, Davis, Miller & Mosher

3,287,786
APPARATUS FOR MAKING SHAPED FELT

Ronald Stansfield Gey, Four Oaks, Sutton Coldfield, England, assignor to Dunlop Rubber Company Limited, London County, England, a British company
Original application Dec. 2, 1963, Ser. No. 327,431, now Patent No. 3,216,082, dated Nov. 9, 1965. Divided and this application Aug. 27, 1965, Ser. No. 483,266
Claims priority, application Great Britain, Dec. 11, 1962, 46,639/62
15 Claims. (Cl. 28—4)

This invention relates to apparatus for making a shaped, that is a non-linear, felt, and is a divisional of application Serial No. 327,431, filed December 2, 1963, now Patent No. 3,216,082.

According to the present invention apparatus for making a shaped felt comprises means for forming a mat of fibers into the desired shape, barbed needles positioned to pierce said mat and means for causing said needles to pierce said mat until substantially the whole of said mat has been pierced.

Usually, the barbed needles are carried by a needling head which is movable to cause said needles to pierce said mat, but alternatively, the barbed needles can be mounted in a stationary position and movement of the shaped mat causes said needles to pierce the surface of said mat. In both cases movement of the mat exposes unpierced portions of the mat to the piercing action of the needles. The barbed needles can be mounted on a needling head which is movable in an oscillatory manner in a direction perpendicular to the surface of the mat to be needled and which may also be movable in a direction parallel to the surface of the mat. When the needles are mounted in a stationary position, then the means to cause said needles to pierce said mat may comprise a plate which is in contact with the shaped mat and which is movable to cause the surface of the mat to come into contact with the needles to effect piercing of the mat, and also to expose unpierced portions of the mat to the piercing action of the needles.

Generally, man-made fibers are included in the mat and usually the fibers used are continuous man-made fibers; where possible these are assembled in a web in extended form and in substantially aligned relationship and then relaxed into a crimped condition prior to needling to cause interpenetration of the fibers.

The fibers may be crimped and then assembled under tension, the tension subsequently being removed thus allowing the crimped fibers to relax and intermingle with one another. This is particularly applicable when using thermoplastic yarn which is crimped in any convenient manner, e.g., by false twisting, in which the yarn is twisted, heat-set, and untwisted; by stuffer-box treatment, in which the yarn is heated in a crushed condition, for example, by feeding into a heated chamber with a smaller exit than inlet hole; by edge crimping, in which the yarn is heated and drawn over a sharp edge; or by passing the yarn between heated fluted rollers. Non-theremoplastic yarn such as rayon may be crimped by cross-linking, for example using a crease-resisting urea formaldehyde resin or by steam setting in lieu of the heat-setting step employed in the case of thermoplastic yarn.

Alternatively, fibers having a potential crimp may be assembled and the crimp developed in the substantially aligned fibers so that they relax and intermingle one with another. For example, fibers spun from two polymers by a conjugate jet, or rayon having an unbalanced skin structure, the skin either being ruptured or having more serrations on one side than on the opposite side, may be relaxed into a crimped condition by wetting; or nylon having disulphide and polyalkylene sulphide cross-links may be assembled whilst wet and relaxed into a crimped condition by drying off the swelling medium such as a mixture of methyl and benzyl alcohols.

Usually, the fibers are assembled in the form of substantially twist-free yarn.

Two or more webs may be superposed prior to needling and may include an intermediate layer of cheaper fibrous material. Some continuous filament yarn may be traversed over the surface of a web, thus producing novel patterning effects in the felt produced, and the crimped yarns may be aligned in a mutually traversing arrangement instead of in parallel formation. The pattern may be produced by using yarns of different colors or by using yarns of different material, e.g., nylon and Terylene, or by using yarns of different deniers.

Additionally, a web may be needled on to a base sheet of knitted or woven fabric, or an elastomeric material, e.g., rubber or plastic material. If desired, binding agents such as thermoplastic resins may be added to the yarns or to the web before, during or after needling.

The degree of hardness of the felts produced may be increased by increasing the number of needle punches and where soft felt is desired the depth of penetration of the needles may be reduced during part of the needling operation.

By modification of fiber denier and degree of crimp and relaxation, the felt density may be decreased and the porosity may be increased. This is important in papermakers' felts or in coverings for dyeing jigs.

Two methods of making a shaped mat in accordance with the invention will now be described by way of example only with reference to the accompanying drawings in which:

FIGURE 1 is a perspective view on an apparatus for the manufacture of an endless belt of felt, FIGURES 1a and 5a are needles used in the felting apparatus, FIGURE 2 is a section of part of the apparatus shown in FIGURE 1 at a further stage in the manufacture, FIGURE 3 is a section through the apparatus during the action of the needles, FIGURE 4 is a view of part of an apparatus for winding a tennis ball core with a covering of fibers, FIGURE 5 is an apparatus for effecting needling of a covered tennis ball core, and FIGURE 6 shows an alternate apparatus for needling a covered tennis ball core.

Twistless, continuous-filament nylon 66 yarn of approximately 840 denier and having 140 filaments in all of approximately 6 denier per filament was crimped on a false-twist crimping machine. The speed of rotation of the false twist spindle was 18,000 revolutions per minute; the yarn feed rate was 57.3 feet per minute and the yarn take-up rate was 56.5 feet per minute giving an overfeed of about 1.7 percent. The temperature of the heater in the false-twist crimping machine was 250° C.

An endless open-weave cotton fabric 1 having a weight of 4 ounces per square yard was mounted on two parallel rollers 2 and 3 positioned apart so that the distance between their outer peripheries was equal to the inside circumference of the finished felt, i.e. 12 inches. The rollers 2 and 3 are mounted in a framework 4 and are rotatable.

Attached to the framework 4 and traversing the space between the rollers 2 and 3 is a needle plate 5 positioned to lie above the surface of the fabric 1, the plate 5 being provided with a number of holes 6 through which barbed needles 7 can be passed. The barbed needles 7 consist of a main shank 8 carrying a number of barbs 9 and are shown in more detail in FIGURE 1a. The barbed needles 7 are mounted on a plate or needling head 10 which is attached through a crank arm 11 to an eccentric 12 mounted on a rotatable shaft 13 to effect an oscillatory movement of the needling head 10 along mounting shafts 14 and 15. A second needle plate 16 is mounted parallel to the needle plate 5 but on the undersurface of the fabric 1, which needle plate 16 is provided with a number of holes 17 to receive the barbed needles 7 after these have passed through the material 1 carried on the rollers 2 and 3.

A continuous length of yarn 18, crimped as described above, is wound under tension over the first roller 2 between the needle plates 5 and 16 and over a third roller 19 carried by supports 20 so that an endless belt of the crimped yarn 18 is formed. The crimped yarn 18 is spaced at about 25 ends per inch over the rollers, and winding is continued until the yarn 18 covers about 10 inches of the width of the rollers. The endless belt of crimped yarn 18 overlies the fabric 1 carried on the rollers 2 and 3. The distance between the outer peripheries of the roller 2 and the roller 19 was 48 inches. The roller 19 is then lifted out of the supports 20 and moved towards the roller 3 to reduce the tension on the crimped yarn 18 to allow it to relax into a crimped condition as shown in FIGURE 2. When the endless belt of crimped yarn 18 is in the form as shown in FIGURE 2, the roller 19 is removed to permit the belt of crimped yarn 18 to fall on to the surface of the fabric 1 carried on the rollers 2 and 3. The rollers 2 and 3 are rotated as the crimped yarn 18 is wound over their surfaces and after removal of the roller 19, heat is applied to the endless belt of crimped yarn 18 to fully develop the crimp in the yarn.

Barbed needles 7 are then passed in an oscillatory movement through the holes 6 and 17 in the needle plates 5 and 16 respectively to pierce the said belt of crimped yarn 18 and the fabric 1 to consolidate the assembly. Whilst the needles 7 are oscillating in a vertical direction the rollers 2 and 3 are rotated to cause movement of the endless belt of crimped yarn 18 to expose to the action of the needles an unneedled portion of the surface of the belt. The endless belt of continuous yarn 18 was rotated beneath the needles until each portion of its surface had passed beneath the needles four times so that the belt of crimped yarn 18 received a total of 3,200 needle punches per square inch of its upper surface. The position of the needles 7 after passing through the continuous belt of crimped yarn 18, and before withdrawal from the belt, is shown in FIGURE 3. After needling for the required number of times, the resultant endless felt had a weight of 13 ounces per square yard.

The method of the invention can be used for providing a tennis ball core with a seamless felt covering, as illustrated in FIGURES 4 and 5 of the accompanying drawings. A rubber core of the type used in the manufacture of tennis balls is provided with a surface coating of an adhesive composition and positioned between two pairs of rollers. The upper pair of rollers 30 and 31 are rotatable, and the lower pair of rollers 32 and 33 are rotatable and also axially-movable. The core 34 of the tennis ball is mounted between the pairs of rollers and as the two upper rollers 30 and 31 rotate the two lower rollers 32 and 33 also rotate and move axially-inwardly and outwardly of the apparatus to impart a spinning motion to the core 34 of the tennis ball. A crimped yarn 35 is fed under tension over the upper roller 30 and as the core 34 spins, the yarn 35 is wound in a random fashion over the surface of the core 34. The winding is carried out under such conditions that the yarn 35, as it is applied to the core 34, is relaxed into its crimped condition. When the desired depth of yarn 35 has been built up over the surface of the core 34, the covered core is removed from between the rollers and transferred to a needling apparatus. This apparatus is shown in FIGURE 5 and consists of a framework 36 on which are mounted two vertical supports 37 carrying intermediate their ends a needling plate 38 having a number of apertures 39 through which barbed needles 40 can pass. The barbed needles 40 are shown in more detail in FIGURE 5a, which shows a needle similar to that shown in FIGURE 1a but rounded off to the first barb so that the point of the needle does not penetrate the rubber core 34 of the tennis ball during the needling operation. The barbed needles 40 are carried on a plate or needling head 41 which is slidably-mounted on the supports 37 and is attached through a crank arm 42 to an eccentric 43 carried on a rotatable shaft 44 to cause a vertical oscillatory motion of the barbed needles 40 through the holes 39 in the needle plate 38. Beneath and mounted parallel to the needle plate 38 is a rotatable plate 45 mounted on a rotatable shaft 46 which is slidable on a further shaft 47 parallel to the needle plate 38. The covered tennis ball core 34 is positioned between the rotatable plate 45 and the needle plate 38 to be under a degree of compression such that the area of contact of the covered core 34 with the plate 45 is approximately 1.5 square inches. The plate 45 is caused to rotate thus causing the covered core 34 to rotate and as this rotates the plate 45 is moved parallel to the needling plate 38 so that as the barbed needles 40 pass through the holes 39 in the needling plate 38 to pierce the covering of crimped yarn 35 on the core 34, the whole surface of the covering of crimped yarn 35 is consolidated.

After the needles 40 have pierced the surface of the covered core 34 the desired number of times, the completed tennis ball is removed from the apparatus. In the needling operation, it is important that the penetration of the needles 40 is not sufficient to cause puncturing of the core 34 of the tennis ball.

The apparatus shown in FIG. 6 is similar to that shown in FIG. 5 and the same reference numerals have been used for like parts in FIGS. 5 and 6. However, the needling head is shown in FIG. 6 as being mounted in a stationary position.

Having now described my invention—what I claim is:

1. An apparatus for making shaped felt comprising a pair of parallel rotatable rollers for forming textile fabrics into an endless band, means to maintain said fibers under tension as they are applied to said rollers, a plurality of barbed needles positioned to pierce said endless band of fibers, said barbed needles being carried by a needling head movable in a direction perpendicular to a surface of said endless band of fibers, and means to move said endless band of fibers to expose all portions of the band to the piercing action of said barbed needles.

2. An apparatus for making a shaped felt comprising means for forming a mat of fibers into a desired shape, a plurality of barbed needles carried by a needling head movable in a direction to cause said barbed needles to pierce the shaped mat and a plate mounted to cause the shaped mat to move in relation to the barbed needles.

3. An apparatus according to claim 2 in which said plate is mounted beneath a needling head a distance from said needling head sufficient to accommodate the shaped article.

4. An apparatus according to claim 2 in which said plate is rotatable to cause said mat to move in relation to said needles.

5. An apparatus according to claim 2 in which said plate is provided with means to move said plate in a reciprocating movement in a direction parallel to the surface of said needle plate.

6. An apparatus for making a shaped felt comprising means for making a mat of fibers into a desired shape, a plurality of barbed needles mounted in a stationary position and positioned to pierce the shaped mat of fibers, and a plate mounted to cause said mat to move in relation to said barbed needles to cause said barbed needles to pierce the mat.

7. Apparatus according to claim 1 in which the means to maintain said fibers in tension as they are applied to said rollers and to remove said tension after application of the fibers to the rollers comprises a third roller which is movable to release the tension after application of the fibers to the rollers.

8. Apparatus according to claim 7 in which said third roller is positioned at a distance from said pair of parallel rotatable rollers and is movable towards said pair of rollers.

9. Apparatus according to claim 8 in which said third roller has a small diameter compared with the diameter of each roller in said pair of parallel rotatable rollers.

10. Apparatus according to claim 1 in which an endless belt is carried on and driven by said pair of parallel rotatable rollers.

11. Apparatus according to claim 10 in which a pair of needle plates are provided one on each side of said endless belt, each needle plate having a number of apertures therein to receive said barbed needles, the apertures in one needle plate being in aligned relationship with the apertures in the other needle plate.

12. Apparatus according to claim 9 in which said third roller is freely-rotatable in a support from which it is removable.

13. Apparatus according to claim 6 in which said plate is mounted beneath a needle plate at a distance from said needle plate to accommodate the shaped article.

14. Apparatus according to claim 6 in which said plate is rotatable to cause said mat to move in relation to said needles.

15. Apparatus according to claim 6 in which said plate is provided with means to move said plate in a reciprocating movement in a direction parallel to the surface of said needle plate.

References Cited by the Examiner
UNITED STATES PATENTS

| | | | |
|---|---|---|---|
| 2,158,533 | 5/1939 | Cavey | 28—4 |
| 2,391,560 | 12/1945 | Foster | 28—4 |
| 2,902,746 | 9/1959 | Bateman | 28—4 |
| 3,010,178 | 11/1961 | Rust | 28—4 |
| 3,117,359 | 1/1964 | O'Byrne | 28—4 |
| 3,150,434 | 9/1964 | O'Byrne | 28—4 |

MERVIN STEIN, *Primary Examiner.*

DONALD W. PARKER, *Examiner.*

L. K. RIMRODT, *Assistant Examiner.*